(12) United States Patent
Strasman et al.

(10) Patent No.: US 7,676,720 B2
(45) Date of Patent: Mar. 9, 2010

(54) METHOD AND SYSTEM FOR PROGRAM BASED REDUNDANCY

(75) Inventors: Nery Strasman, Ramat Gan (IL); Ran Oz, Moddin (IL); Nir Bejerano, Ramat Gan (IL)

(73) Assignee: BigBand Networks, Inc, Redwood City, CA (US)

( * ) Notice: Subject to any disclaimer, the term of this patent is extended or adjusted under 35 U.S.C. 154(b) by 706 days.

(21) Appl. No.: 11/141,849

(22) Filed: May 31, 2005

(65) Prior Publication Data

US 2006/0005099 A1 Jan. 5, 2006

Related U.S. Application Data

(60) Provisional application No. 60/576,157, filed on Jun. 1, 2004.

(51) Int. Cl.
*H04L 1/00* (2006.01)
(52) U.S. Cl. .................... 714/747; 714/776
(58) Field of Classification Search ........... 714/747, 714/820, 776
See application file for complete search history.

(56) References Cited

U.S. PATENT DOCUMENTS

| | | | |
|---|---|---|---|
| 5,091,945 A * | 2/1992 | Kleijn | 704/219 |
| 5,959,972 A * | 9/1999 | Hamami | 370/228 |
| 6,222,820 B1 | 4/2001 | Hamami | |
| 6,289,017 B1 * | 9/2001 | Shani et al. | 370/395.53 |
| 6,434,141 B1 | 8/2002 | Oz et al. | |
| 6,532,562 B1 * | 3/2003 | Chou et al. | 714/776 |
| 6,594,798 B1 * | 7/2003 | Chou et al. | 714/820 |
| 6,697,985 B1 * | 2/2004 | Ilani | 714/751 |
| 6,798,744 B1 * | 9/2004 | Loewen et al. | 370/235 |
| 6,996,097 B1 * | 2/2006 | Chou et al. | 370/389 |
| 2002/0076143 A1 * | 6/2002 | Foltzer | 385/24 |
| 2003/0110409 A1 | 6/2003 | Gale et al. | |

* cited by examiner

*Primary Examiner*—M. Mujtaba K Chaudry
(74) *Attorney, Agent, or Firm*—Pearl Cohen Zedek Latzer, LLP

(57) ABSTRACT

A system that includes: (ii) at least one input port adapted to receive multiple addressable packets that include media content that belong to multiple media streams and to at least one duplicating media stream; (ii) at least one processor adapted to process the multiple addressable packets to determine media stream layer errors to control, and to participate in a replacement of addressable packets that include media content that belong to a defective media stream by addressable packets that belong to a corresponding duplicate stream. A method for providing a video stream over a network, the method includes: (i) receiving a first multi purpose communication protocol stream that includes multiple media streams and receiving at least one duplicate media stream; (ii) detecting a error in a media stream program; and replacing the defective media stream by a duplicate media stream.

37 Claims, 8 Drawing Sheets

METHOD AND SYSTEM FOR PROGRAM BASED REDUNDANCY

RELATED APPLICATIONS

This application claims the priority of U.S. provisional application Ser. No. 60/576,157, filed Jun. 1, 2004, titled "Program level redundancy for MPTS over UDP".

FIELD OF THE INVENTION

The invention relates to methods and systems for program based redundancy.

BACKGROUND OF THE INVENTION

Methods and systems for compressing and transmitting media signals are known in the art. Compressed digital video is largely becoming the preferred medium to transmit to video viewers everywhere. Parts of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures; each picture includes a plurality of pixels. A video picture includes a plurality of slices, each slice including a plurality of macro blocks. The audio and video streams are provided to an audio encoder and to a video encoder respectively to generate compressed audio and video elementary streams, also referred to as elementary streams.

Elementary streams are packetized to produce PES packets. PES packets made up of elementary streams that form a program share a common time base. The PES packets may also include additional information. PES packets of distinct elementary streams can be arranged as either a Program Stream or a Transport Stream. At least one or more stream of PES packets having a common base time are usually combined to a Program Stream.

A Transport stream combines one or more programs with one or more independent time bases into a single stream. Transport streams include transport packets of 188 bytes. Transport stream packets start with a transport packet header. The header includes a packet ID (PID). Transport stream packets of one PID value carry data of a single elementary stream. Transport streams include Program Specific Information (PSI) tables. The PSI tables specify which PIDs and accordingly which elementary streams are associated to form each program.

Transport streams can include a single program of a multiplex of different programs. The latter is known as Multiple Program Transport Stream (MPTS).

Transport streams are designed to convey media (video and/or audio) signals. Other communication protocols can convey multiple information types that differ from video. These communication protocols are not tailored to carry only video and can carry video as well as other types of information. Such communication protocols are referred to as Multi Purpose Communication Protocols (MPCPs).

Usually, communication networks use a stack of communication protocols. The seven layer OSI model includes seven layers, while other commonly used protocol stacks include a different amount of layers.

MPCP protocols are usually the lower layer protocols of a protocol stack. They may include inter-network layer protocols, network interface layer protocols, and even transport layer communication protocols that differ from the MPEG transport stream.

Some commonly used MPCP protocols are ATM, IP, UDP, Ethernet, GigaEthernet, and the like.

One common protocol stack includes MPEG Transport stream, UDP, IP and Ethernet. Accordingly, an MPCP thread that conveys such an MPEG Transport stream includes MPEG Transport packets that are encapsulated within IP packets, UDP packets, Ethernet frames, and the like.

FIG. 1 illustrates a prior art Ethernet frame 90. Ethernet frame 90 includes an Ethernet header 91, an IP header 92, a UDP header 93, an Ethernet frame trailer 94 as well as multiple MPEG Transport packets 75. An exemplary transport packet (of a MPEG Transport) 75 includes transport stream payload (not shown) and a transport stream header. Various fields of the transport stream header are shown. Some are omitted for simplicity of explanation. The illustrated fields of the transport stream header include: a transport error indication bit 81, PID field 82, continuity counter field 83, discontinuity indicator field 85, and PCR field 87. The discontinuity indicator field 85 is a part of an adaptation field 84. The PCR field 87 is a part of optional fields 86.

A modern multiple purpose communication network includes multiple purpose components, such as routers, switches and the like. In order to improve the resilience of the multiple purpose communication network many components receive an MPCP thread and a duplicate MPCP thread.

Some of these multiple purpose communication network component are able to perform various MPCP operations. They are not capable of performing video related operations.

These MPCP operations may include processing MPCP information, performing error corrections based upon the MPCP information, requesting a re-transmission of certain MPCP packets, re-arrangement, assembling and fragmentation and the like.

For example, the MPCP processing may include retrieving or extracting an IP header, a UDP header and/or an Ethernet header or trailer, in order to detect IP layer failures, UDP layer failures, Ethernet layer failures and the like. These error can include Ethernet link loss, no IP relevant activity, no data on the relevant UDP port and the like.

Various well-known methods for providing redundancy are known in the art. U.S. Pat. No. 5,959,972 of Hamami, titled "method of port/link redundancy in an ATM switch"; U.S. Pat. No. 6,289,017 of Shami et al., titled "Method of providing redundancy and load sharing among multiple LECs in an asynchronous mode network"; U.S. Pat. No. 6,222,820 of Hamami, titled "method of VCC/VPC redundancy for asynchronous transfer mode networks"; U.S. patent application 20020076143 of Foltzer, titled "Multi-channel, multi-mode redundant optical loop having a bus topology"; U.S. patent application 20030110409 of Gale, et al. titled "method and apparatus for network fault correction via adaptive fault router", all being incorporated herein by reference, provide a brief view of some state of the art redundant networks a method for providing redundancy.

Typically, once a link fails the traffic that was conveyed over the link is re-directed—routed through another link. If the link conveyed bi-directional traffic, the bi-directional traffic is re-routed.

U.S. Pat. No. 5,959,972 describes a method for implementing redundancy of both links and ports between two switches, e.g., ATM switches. A redundant link connection between two ATM switches is constructed using two separate parallel communication links connected between separate ports on each of the switches. One communication link is termed the main link and the other is termed the backup link. Two virtual circuits are setup between the backup link ports. One is a direct virtual circuit directed over the backup link. The other is an indirect virtual circuit that is routed over the main link via the main link ports. A virtual circuit is also setup over the main link for regular data traffic. In addition, a standby virtual circuit is setup over the backup link but is placed in standby until the occurrence of a failure. Until a failure occurs, traffic normally proceeds over the main link while the backup link ports transmit keep alive messages to each other over the indirect virtual circuit that is routed over the main link. When the main link fails, either one or both of the backup link ports detects the failure. The data traffic is then switched from the main link to the backup link. The failure is detected by the failure of the backup link ports to receive keep alive messages.

U.S. patent application 20020076143 describes an optical local loop having a bus topology with a pair of optical fibers disposed among a plurality of Optical Network Units (ONUs). A Host Digital Terminal (HDT) is disposed at the head end of the optical local loop for concentrating optical signals for a network. Redundant transceiver banks are provided within the HDT for operating with the optical signals effectuated at a plurality of wavelengths which are multiplexed and de-multiplexed via a pair of Wavelength Division Multiplex (WDM) connecters disposed on corresponding optical fibers. During transmission, the ONUs excite both optical fibers and the received optical signals are monitored in the HDT for quality and integrity of the optical paths. A selectively actuatable mechanism is provided in the HDT to switch downstream transmission to the ONU nodes from one optical path to the other optical path of the local loop based on the path quality and integrity.

Once a MPCP failure is detected the multiple purpose communication network component switches from one MPCP thread to the secondary MPCP thread. Thus, it switches from one MPTS to another MPTS, such as a duplicate MPTS.

The switching between a first MPTS to a second MPTS may can cause temporary visual artifacts or otherwise temporarily reduce the quality of multiple programs, including programs that were properly conveyed over the multiple purpose communication network.

In addition, in cases that both MPCP threads are partially damaged, the transition can result in a replacement of one or more programs by one or more defective duplicate programs.

There is a need to provide systems and method for providing redundancy in a more efficient manner.

SUMMARY OF THE INVENTION

A method for providing a video stream over a network, the method includes: (i) receiving a first multi purpose communication protocol stream that includes multiple media streams and receiving at least one duplicate media stream; (ii) detecting a error in a media stream program; and (iii) replacing the defective media stream by a duplicate media stream.

According to an embodiment of the invention the error includes a quality level degradation.

A method for providing a video stream over a network, the method includes: (i) receiving multiple addressable packets that include media content that belong to multiple media streams and to at least one duplicating media stream; (ii) processing the multiple addressable packets to determine media stream layer errors; and (iii) replacing addressable packets that include media content that belong to a defective media stream by addressable packets that belong to a corresponding duplicate stream.

A system that includes: (i) at least one input port adapted to receive a first multi purpose communication protocol stream that includes multiple media streams and at least one duplicate media stream; and (ii) at least one processor adapted to detect a error in a media stream program and to participate in a replacement of the defective media stream by a duplicate media stream.

A system, that includes: (i) at least one input port adapted to receive multiple addressable packets that include media content that belong to multiple media streams and to at least one duplicating media stream, and (ii) at least one processor adapted to process the multiple addressable packets to determine media stream layer errors to control, and to participate in a replacement of addressable packets that include media content that belong to a defective media stream by addressable packets that belong to a corresponding duplicate stream.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The following detailed examples refer to MPEG compliant transport streams and programs. Those of skill in the art will appreciate that the invention can be applied to other compressed video streams. Furthermore, as video streams are much larger than audio streams the modification of the video streams alone is discussed in detail.

According to an embodiment of the invention a program can be replaced by a duplicate program of a higher quality.

According to an embodiment of the invention only non-defective programs that are transmitted with defective programs are not replaced. Thus, the quality of non-defective programs is not affected by the replacement of the defective programs. Thus, visual artifacts that can result from witching a program are avoided or at least substantially reduced.

Figure 2:
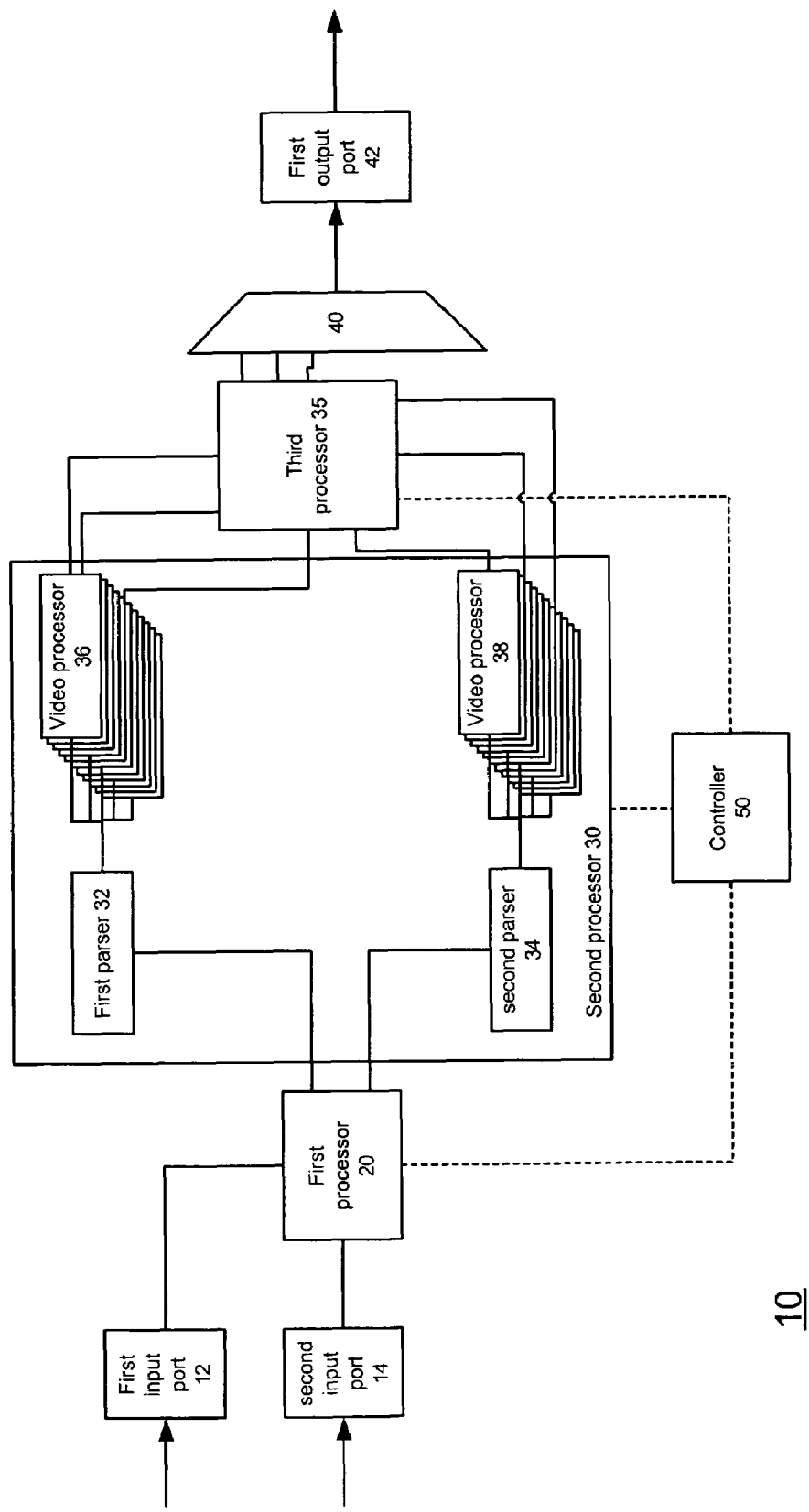
FIG. 2 illustrates a system, according to an embodiment of the invention.

FIG. 2 illustrates a system 10, according to an embodiment of the invention.

System 10 includes a first input port 12 and a second input port 14, a first processor 20, a second processor 30, a third processor 35, an output multiplexer 40 and an output port 42. It is noted that system 10 can have two output ports, one for providing a main MPCP stream and the other for providing a duplicate MPCP stream.

According to another embodiment of the invention system 10 can output MPEG Transport Streams instead of MPCP threads. The location of system 10 within the network, and especially the type of network that is connected to the output ports of system 10 determines the type of output signals provided by system 10.

It is further noted that a duplicate program can be included within both outputted MPCP streams, especially if it replaced a defective program.

The first input port 12 is adapted to receive a first MPCP stream (or thread) that includes a first MPEG Transport Stream as well as MPCP information, such as MPCP headers, MPCP trailers and the like.

The second input port 14 receives another MPCP thread or stream (referred to as duplicate thread) that conveys another MPEG Transport Stream (referred to as duplicate TS) that includes substantially the same programs (referred to as duplicating programs) as the first Transport Stream (TS). The second MPCP thread also includes MPCP information.

The duplicating programs are conveniently outputted by system 10 only when the transmission of the first TS failed.

It is noted that the duplicate TS can include different programs than the first TS, but this can reduce the resilience of the network.

Figure 1:
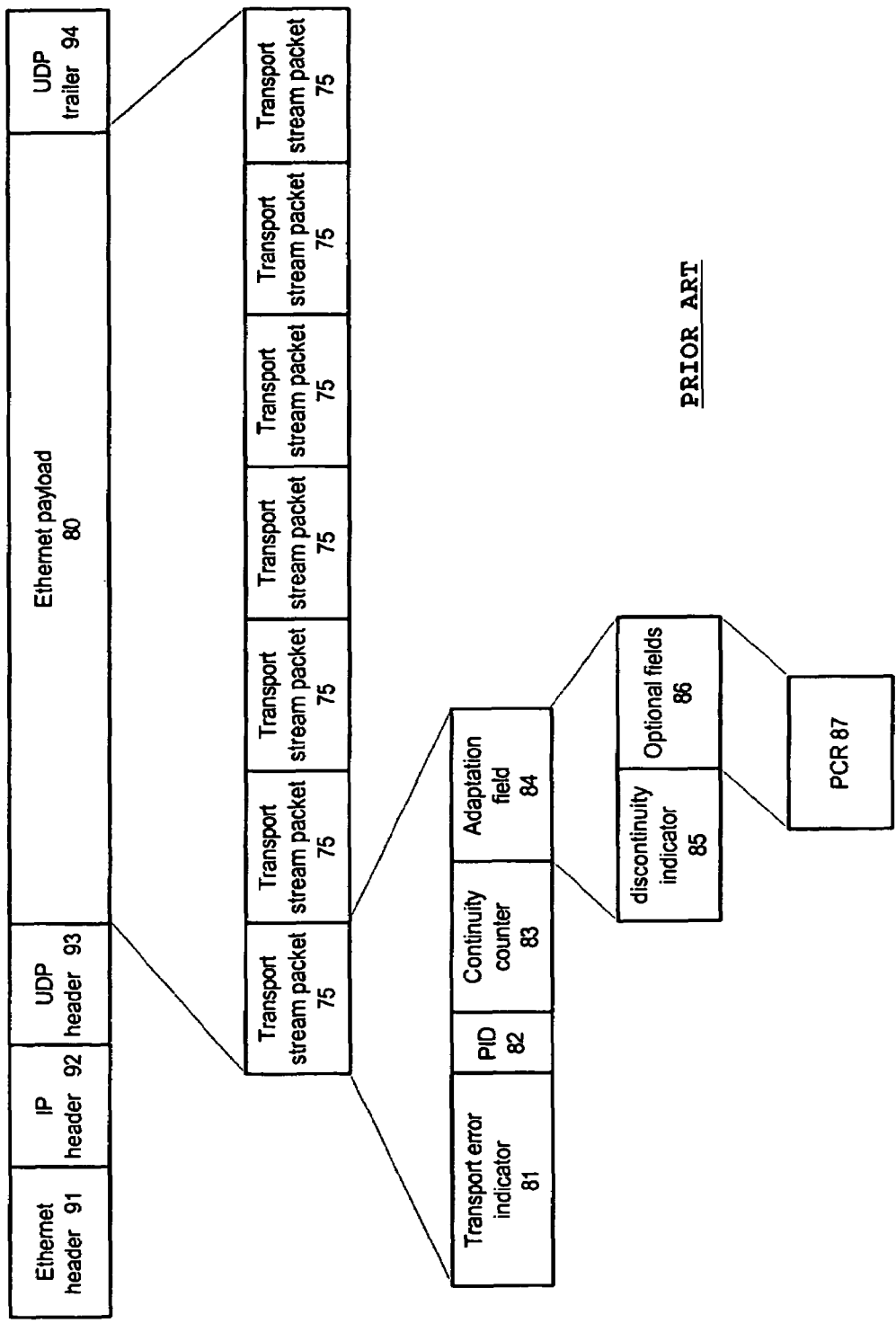
FIG. 1 illustrates a prior art Ethernet frame.

Those of skill in the art will appreciate that system 10 can include more than two input ports and that duplicate programs can be provided via multiple ports. For example, if the first TS includes ten programs denoted Pr1-Pr10 then the second input port 14 can receive a second TS that can include Pr1-Pr10, but can also receive Pr1-Pr7 while another port (not shown) can receive programs Pr8-Pr10. It is further noted that the amount of processors within system 10 as well as the functions performed by each processor can vary from those illustrated in FIG. 1 without departing from the scope of the invention.

It is further noted that the system 10 can monitor the quality (or other characteristics) of programs within the first TS and within the second TS and switch between programs based upon differences between the characteristics of the programs and the duplicating programs. This switching can be made, additionally or alternatively, in response to communication errors.

The first input port 12 and the second input port 14 are connected to the first processor 20, although the second input port 14 can be connected via a switch (not shown) that allows the reception of the duplicating MPCP stream only when an error is detected.

The first processor 20 performs various multiple purpose communication protocol operations, such as but not limited to encapsulation, multiple purpose communication protocol analysis, error corrections, and the like. For example, this first processor 20 can perform Ethernet, IP and UDP de-capsulation operations, UIDP, IDP, Ethernet header processing and the like. It is noted that the analysis is optional, and that system 10 can base its decisions on the analysis of the second processor 30 alone.

The second processor 30 is capable of determining program errors. The determination can be based upon various indications, such as but not limited to transport stream error that is indicated by a transport error bit in a transport stream header, a continuity counter discontinuity, a temporal absence of a certain PID, inconsistencies in the values of CRC fields, inconsistencies in the values of PCR, any MPEG syntax error, illegalities in MPEG buffer states, inconsistencies between signaling of a PUSI flag in a transport stream header, actual presence of a payload unit beginning, and the like. The MPEG buffer state can be emulated within system 10.

It is further noted that some program errors can be corrected by second processor 20, and if the correction fails then the defective program is replaced by a corresponding duplicate program. Such error corrections can include PCR reconstruction, forward error correction and the like.

The second processor 30 conveniently includes a first parser 32, for separating the programs of the first TS from each other. The second processor 20 conveniently includes a second parser 34, for separating the programs of the second TS from each other.

The first parser 32 is connected to multiple video processors 36 that are capable of processing each program in order to detect program level failures or errors. Conveniently, a video processor 36 is allocated to each program.

The second parser 34 is connected to multiple video processors 38 that are also capable of processing each program of the second TS 121 in order to determine and detect program level failures or errors. This connection is optional although it can prevent the system 10 from switching from a defective program of the first TS to another defective program of the second TS.

It is noted that the number of video processors 36 can be equal to the number of video processors 38 but this is not necessarily so. For example, fewer video processors 38 can be used. The latter configuration can be used when an analysis of programs of the second TS is triggered by a failure of a program of the first TS.

It is noted that the second processor 30 can have various corrections capabilities, for example, feed forward error correction capabilities, but this is not necessarily so.

According to yet another embodiment of the invention the second processor 30 is further adapted to perform rate-shaping schemes.

The second processor 30 is connected to a third processor 35 that is capable of performing MPCP operations such as encapsulating media stream packets into MPCP packets. The third processor 35 can receive from the first processor the MPCP information that was removed from the packets by the first processor 20 or by the second processor 30. The third processor 35 can also replace address information associated with some packets, especially with duplicate packets.

Conveniently, system 10 includes one or more controlling units, such as controller 55. The controller 55 can receive error indications from video processors 36 and optionally from first processor 20, and/or video processors 38, and determine which programs will be sent to the output multiplexer 40.

The controller 55 can select which program will be outputted by system 10 by selectively providing programs from the first TS and/or the second TS.

It is noted that system 10 can have at least one additional output port for outputting additional streams and/or duplicate streams.

Figure 3:
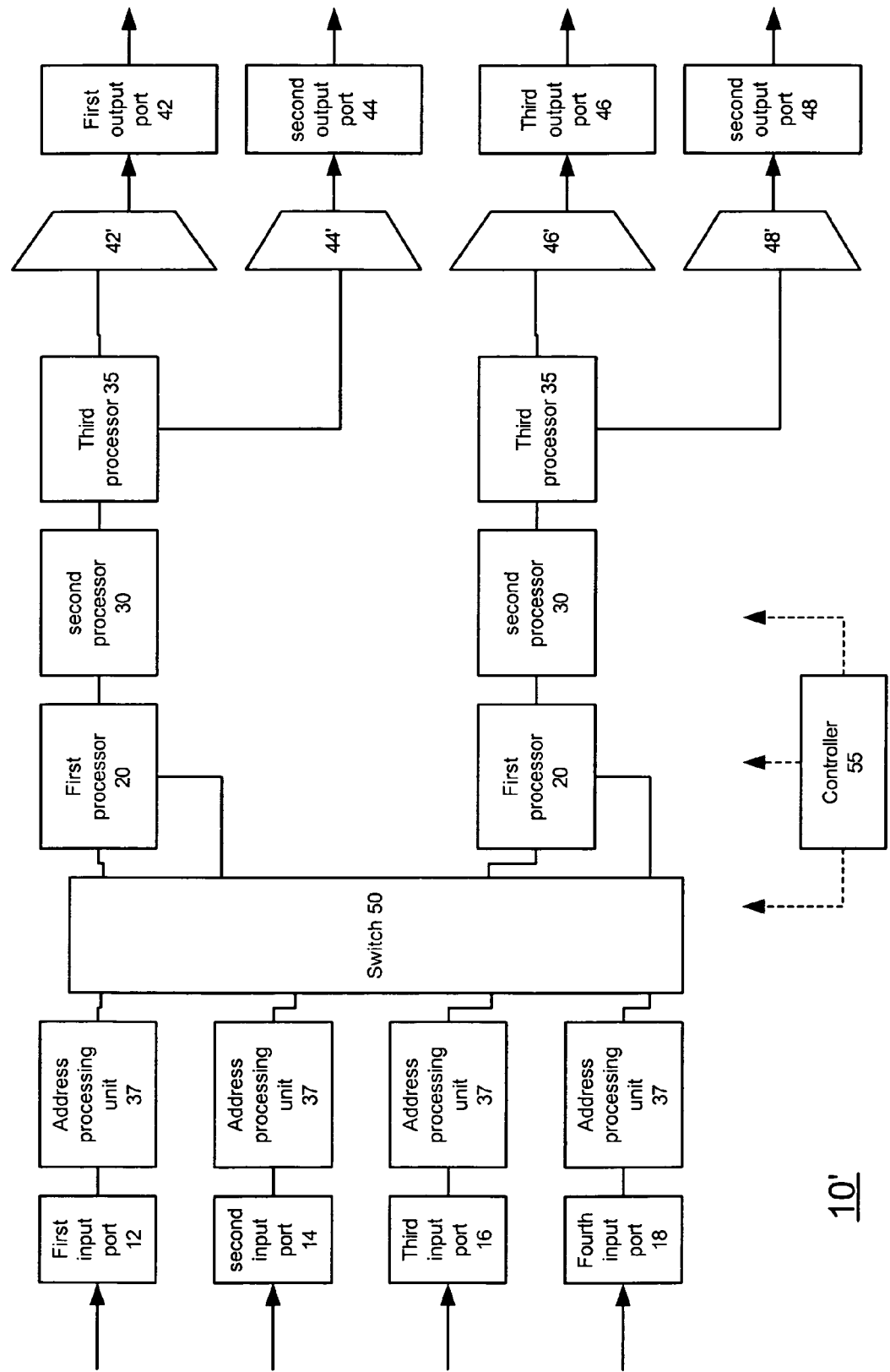
FIG. 3 illustrates a system according to another embodiment of the invention.

FIG. 3 illustrates a system 10' according to another embodiment of the invention. System 10' differs from system 10 by being able to receive multiple MPCP streams and to output multiple MPCP streams, or output multiple TSs. It is noted that system 10' can output one or more MPCP threads as well as one or more TSs.

System 10' includes four input ports 12, 14, 16 and 18, address processing units 37, a pair of first processors 20, a pair of second processors 30, a pair of third processors 35, a switch 50, controller 55, four output multiplexers 42', 44', 46' and 48, and four output ports 42, 44, 46 and 48. It is noted that the amount of first and second processors 20 and 30 can be only one or can exceed a pair, but usually a video processor such as video processors 38 or 38 is provided to each program.

The four input ports 12-18 are connected to four address processing units 37. The address processing units 37 can alter address information associated with incoming packets to allow the switching of these packets to the right output ports of switch 50. This re-mapping can be applied in order to replace a defective media stream by a duplicate stream. According to another embodiment of the invention the re-mapping is done in order to guarantee that received packets arrive to the appropriate output port of switch 50.

The alteration of address information will be further illustrated in the following example. It is assumed that: (i) switch 50 has four inputs In1-In 4 and four outputs Out1-Out4; (ii) packets that belong to a proper (not defective) MPCP that are received at the first input port 12 are provided to input In1 and exit through output Out1 of switch 50, (iii) packets that belong to a proper (not defective) duplicate MPCP that are received at the third input port 16 are provided to input In3 and exit through output Out3 of switch 50, (iv) packets that belong to a defective program that is conveyed by a certain MPCP that is received at the first input port 12 are not provided to any input of switch 50 and packets that belong to a proper (not defective) duplicate program that is conveyed by a duplicate MPCP that is received at the third input port 16 replace the packets of the defective program by being provided to In3 and outputted via Out1 of switch 50.

Accordingly, the address information associated with the replacing packets should be changed in order to provide them to Out1 either instead of being provided to Out3 of switch 50 or in addition to being provided to Out 3. It is noted that the latter case requires duplication of the packets of the replacing program. The duplication can be performed by the address processing unit 37.

According to an embodiment of the invention one or more address processing units 37 is capable of receiving un-addressable packets, such as transport stream packets that are not encapsulated within MPCP packets, and to assign addresses to these packets, such as to allows these packets to be switched to the proper output port of switch 50.

A method and system for performing such address assignment are illustrated in U.S. Pat. No. 6,434,141 of Oz et al. titled "Communication management system and method" which is incorporated herein by reference.

The outputs of switch 50 are connected to the pair of first processors 20. These first processors 20 receive multiple MPCP threads that include four MPTSs accordingly.

The pair of second processors 30 are connected to third processors 35 that are connected to output multiplexers 42', 44', 46' and 48'. Each output multiplexer is connected to a corresponding output port (42, 44, 46 and 48) of system 10'.

Figure 4:
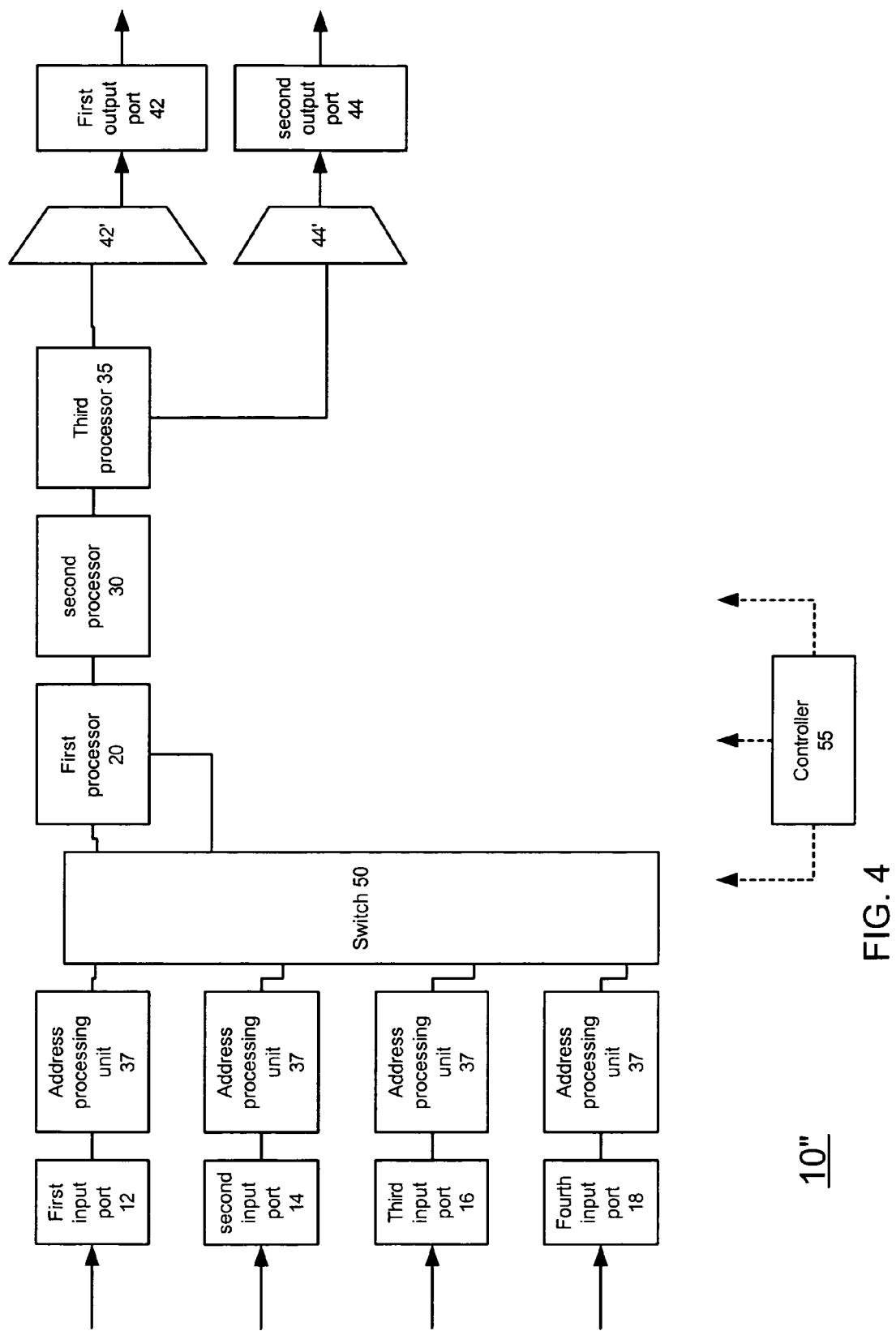
FIG. 4 illustrates a system according to another embodiment of the invention.

FIG. 4 illustrates a system 10" according to another embodiment of the invention.

System 10" does not output duplicate MPCP threads. System 10" has a first processor 20, second processor, third processor 35, two output multiplexers 42' and 44, controller 55 and two output ports 42 and 44.

If controller 55 decides to replace one media stream by a corresponding duplicate stream it orders the address altering unit 37 that receives that duplicate media stream to alter the address of the duplicate stream packets such as to switch them to the first processor 20.

It is noted that the address can be included within the MPCP packets that enter system 10' but this is not necessarily so, as switch 50 can have his own routing or switching map that can require the address processing units 37 to add address information to the incoming MPCP packets.

Figure 5:
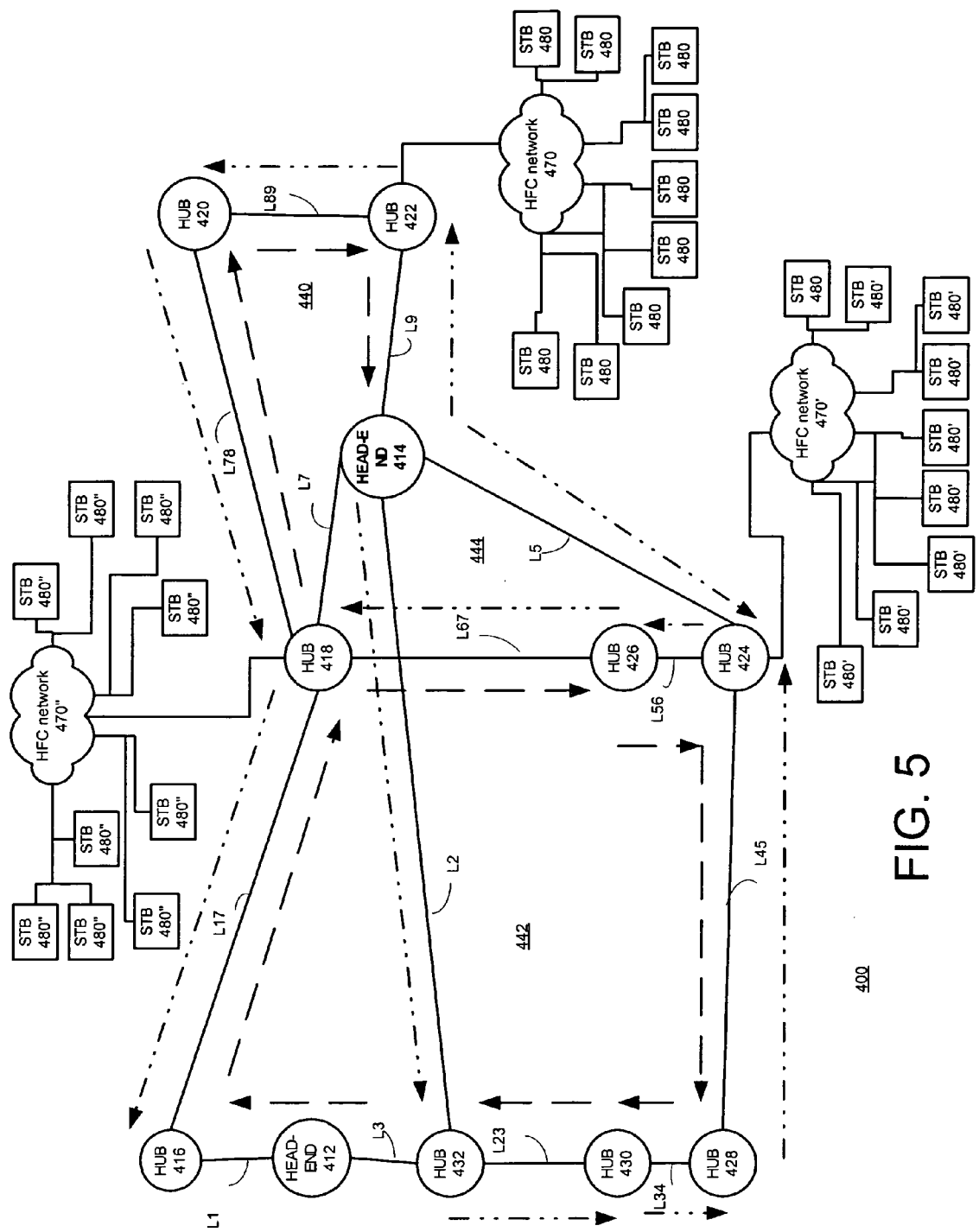
FIG. 5 illustrates a network according to an embodiment of the invention.

FIG. 5 illustrates a network 400 according to an embodiment of the invention. Network 400 interconnects two media stream sources such as headends 412 and 414 to multiple intermediate entities such as hubs 416-432. Conveniently some or even all of hubs 416-432 are connected to multiple users, typically via local cable access networks. For simplicity of explanation only the connection of certain hubs (418, 422 and 424) to HFC networks and to end user equipment is illustrated.

Each hub out of hubs 416-432 and each headend 312-414 can include either one of systems 10, 10' or 10". Thus, these hubs can receive multiple MPCP threads that include multiple MPCPs, and replace only defective programs within the TSs.

First headend 412 is connected to hub 416 via link L1. Hub 416 is connected, via link L17, to hub 418. Hub 418 is connected, via link L7, to second headend 414 and, via links L78 and L67, to hubs 420 and 426. Hub 422 is connected, via link 89 to hub 420 and, via link L9, to second headend 414. Hub 424 is connected, via link L56, to hub 426 and via link L5 to second headend 414. Hub 428 is connected, via links L45 and L34, to hubs 424 and 430. Hub 432 is connected, via link L23, to hub 430, via link L3 to first headend 412 and via link L2 to second headend 414. Some of these hubs are conveniently primary hubs while others are secondary hubs.

Hub 422 is connected to multiple end-users equipment, such as but not limited set top boxes STB 480 via Hybrid Fiber Coax network 470. Hub 424 is connected to multiple end-users equipment, such as but not limited to set top boxes STB 480' via network 470'. Hub 418 is connected to multiple end-users equipment, such as but not limited to set top boxes STB 480" via network 470".

Conveniently either these hubs or networks 470-470" strip the MPCP information to provide TS packets to the STB 480, 480', or 480". This is not necessarily so and de-capsulation process can be performed within the end user equipment itself.

Hubs 418, 420 and 422 and second headend 414 are connected such as to form a first ring 440. Hubs 416, 418, 424, 426, 428, 430 and 432 and first headends 412 are connected to form a second ring 442. Hubs 418, 424 and 426 and second headend 414 are connected such as to form a third ring 444.

First headend 412 provides a first MPCP thread that propagates at a clockwise direction over rings 442 and 444. Second headend 414 provides a duplicate MPCP thread that propagates at a counter-clockwise direction over rings 440 and 444.

It is noted that the bi-directional propagation of MPCP threads along each ring usually does not include sending MPCP threads towards a headend. For example, hubs 416 and 432 that are connected to the first headend 12 do not send it MPCP threads from the second headend 414.

In any case if one of these hubs or even headend detects a program level error and is not able to correct it replaces one program by another, instead of replacing the whole MPCP thread.

Figure 6:
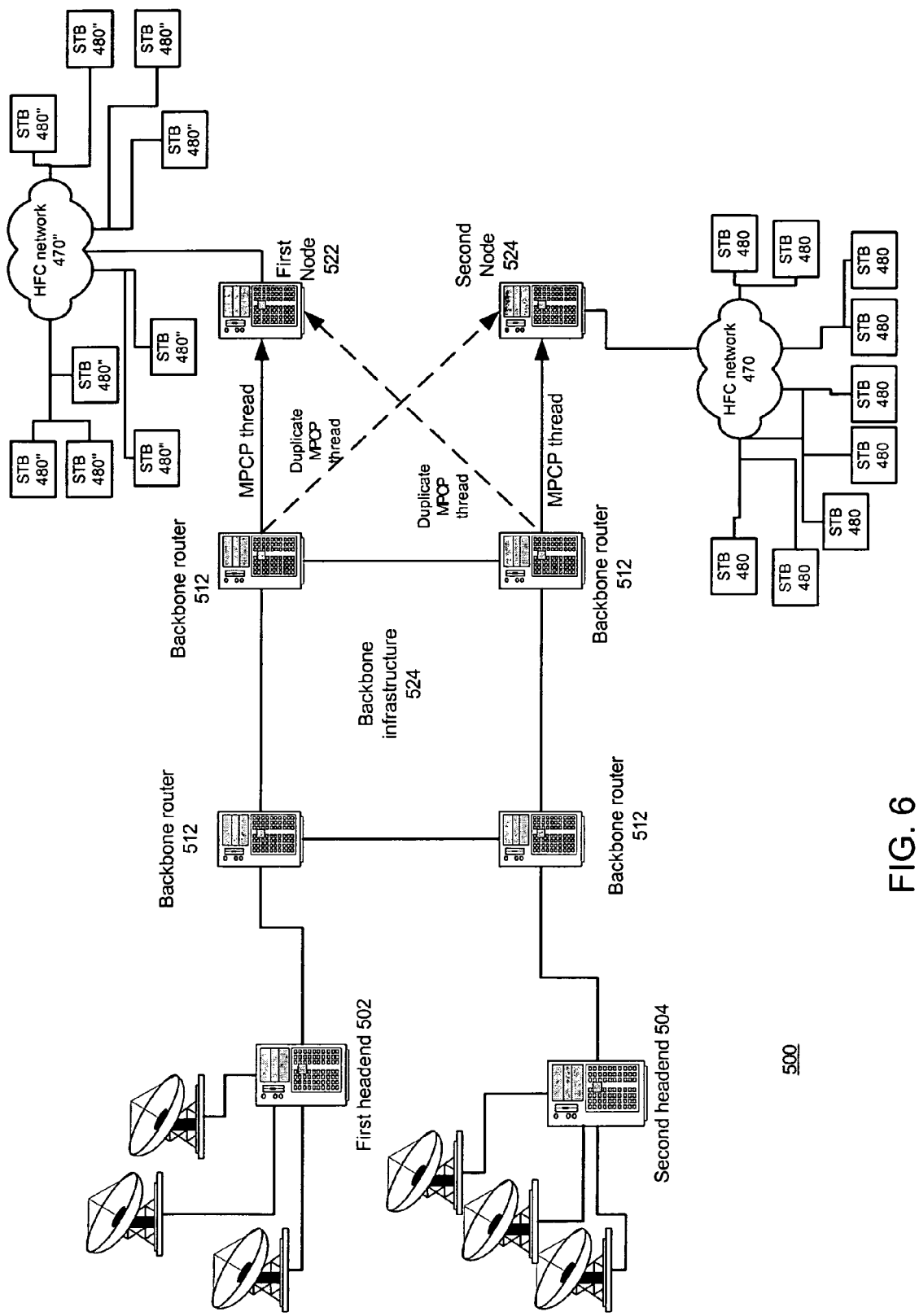
FIG. 6 illustrates a network according to an embodiment of the invention.

FIG. 6 illustrates network 500 according to an embodiment of the invention.

Network 500 includes first and second headends 502 and 504, a backbone infrastructure 524 that includes backbone routers 512, a first node 522, a second node 524, two HFS networks 470 and 470" and multiple end-users equipment such as STB 480" and STB 480.

The first and second headends 502 and 504 receive media streams from satellite dishes and can perform various video processing operations, as well as providing MPCP threads that include multiple media streams. The MPCP threads are conveyed over the backbone infrastructure 524. Each of first node 522 and second node 524 may include either one of systems 10' 10' and 10".

The configuration illustrated in FIG. 6 resembles system 10", as each node receives one or more MPCP threads and one or more MPCP duplicate threads and does output only one or more MPCP thread or even one or more MPTSs.

It is noted that even if system receives a MPCP thread and a duplicate MPCP thread that does not convey the same programs, but includes one or more duplicate programs, then a failed program can be replaced by a received duplicate program.

The first and second nodes 522 and 524 receive MPCP threads as well as duplicate MPCP threads from the backbone infrastructure 524. Conveniently, an MPCP thread and a corresponding MPCP thread are provided to a node from different backbone routers 512.

According to another embodiment of the invention the first node 522 can send the second node one or more duplicate MPCP threads and vise verse, but this is not necessarily so.

Figure 7:
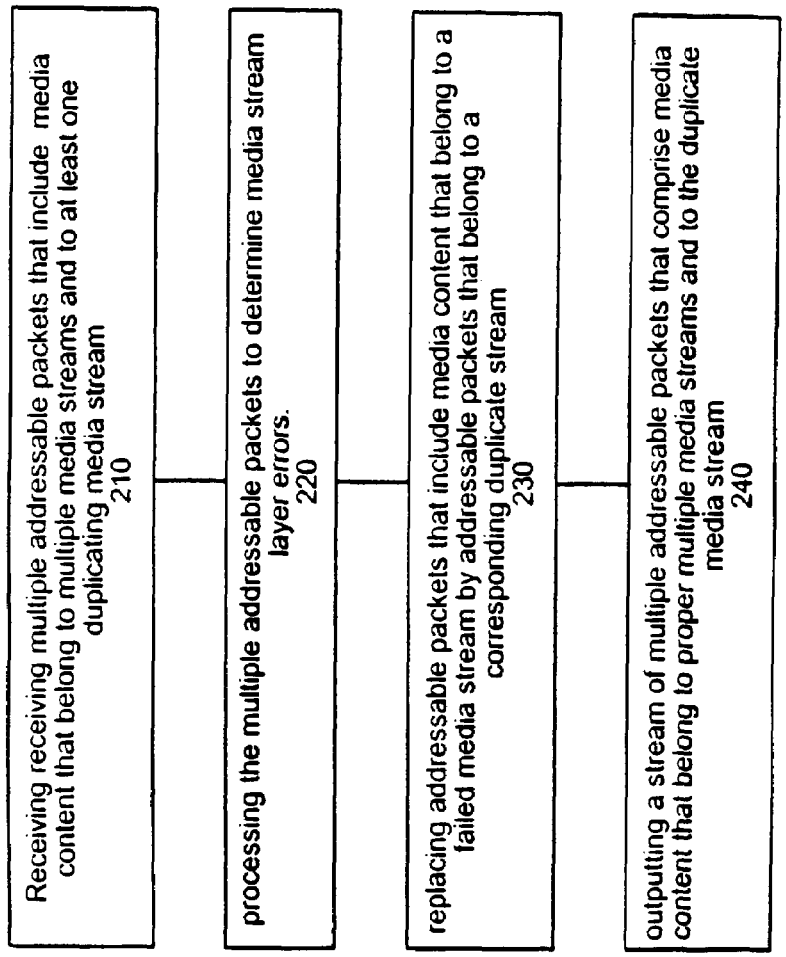
FIG. 7 is a flow chart of a method, according to an embodiment of the invention.

FIG. 7 is a flow chart of method 200, according to an embodiment of the invention.

Method 200 starts by stage 210 of receiving multiple addressable packets that include media content that belong to multiple media streams and to at least one duplicating media stream. According to an embodiment of the invention all media streams out of the multiple media streams have corresponding duplicate streams, but this is not necessarily so. Conveniently, the multiple media streams are arranged in multiplexes and multiple duplicating media streams are arranged in corresponding duplicating multiplexes.

Stage 210 is followed by stage 220 of processing the multiple addressable packets to determine media stream layer errors. These errors can relate to the transport stream layer, to elementary stream errors, and the like. Conveniently stage 220 includes separating media content from additional information included within the addressable packets. Conveniently the separation includes de-capsulation of the addressable packets.

It is noted that if no errors were detected stage 220 is followed by a stage of outputting at least one stream of addressable packets that does not include packets that originate from a duplicating media stream.

It is further noted that even if an error is detected then method 200 can include trying to fix the error instead of switching between programs.

Stage 220 is followed by stage 230 of replacing addressable packets that include media content that belong to a defective media stream by addressable packets that belong to a corresponding duplicate media stream.

Stage 230 is followed by stage 240 of outputting a stream of multiple addressable packets that comprise media content that belong to proper multiple media streams and to the duplicate media stream. Thus, this output stream includes proper (not erroneous) media streams.

Conveniently, stage 220 or stage 240 include performing media processing operations of the media content. These operations are not necessarily related to the detected errors. These operations may include rate shaping and the like.

Conveniently, method 200 includes replacing address information associated with the addressable packets in response to a required destination of these media stream packets. For example, the address information replacement can allow a replacement of a defective media stream by a duplicate media stream. Referring to the example set forth in FIG. 2, addressable packets that are received at input port 18 and are destined to be outputted to output port 48 can be re-directed to output port 42 such as to replace addressable media packets that convey a defective media stream.

According to an embodiment of the invention a duplicate media stream can be duplicated to facilitate the provision of that stream in a duplicate thread and also to replace a defective media stream.

According to an embodiment of the invention stage 240 includes outputting non-addressable packets. This can occur when the method 200 outputs packets to be provided to an HFC network, or otherwise to networks or equipment (including end user equipment) that does not require the addresses. This may occur where a single TS is conveyed over a unique path while other TS are conveyed over different paths.

According to an embodiment of the invention method 600 can include replacing a program by a duplicate program of a higher quality. It is noted that the replacement can be triggered by a replacement of a defective program, but this is not necessarily so. The quality of programs can be monitors in a periodical manner, in a random manner, in a pseudo-random manner, in response to an event or in combination thereof.

Figure 8:
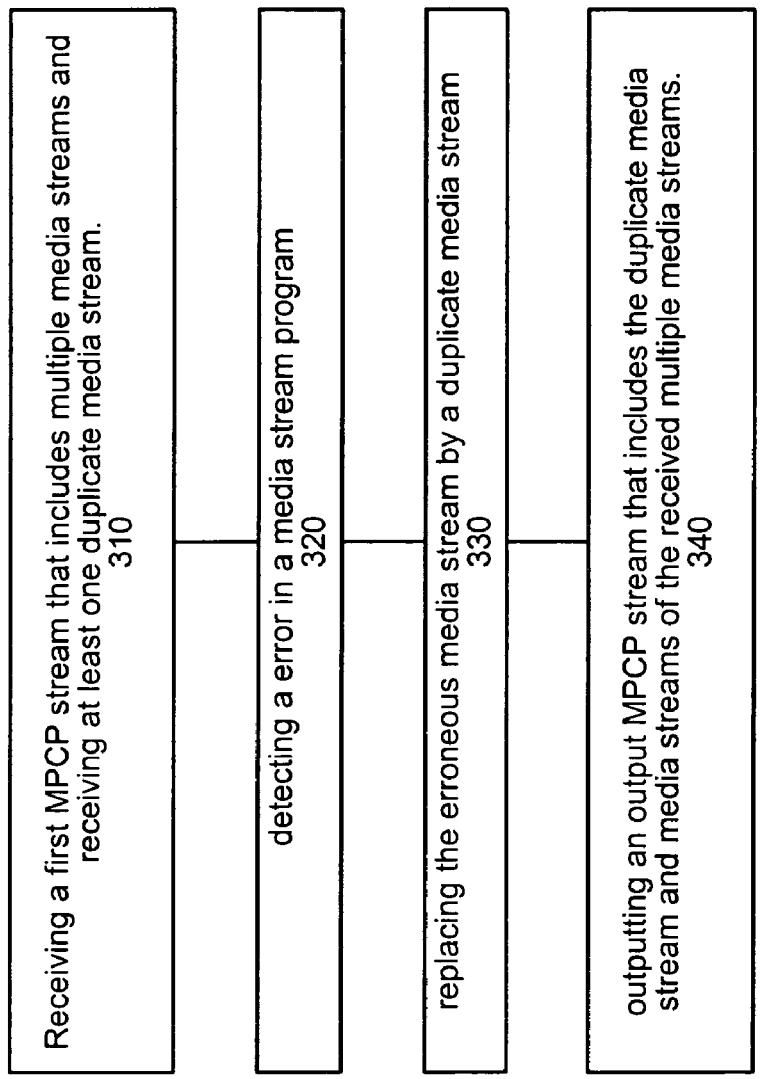
FIG. 8 is a flow chart of a method, according to an embodiment of the invention.

FIG. 8 is a flow chart of method 300, according to an embodiment of the invention.

Method 300 starts by stage 310 of receiving a first MPCP stream that includes multiple media streams and receiving at least one duplicate media stream.

Stage 310 is followed by stage 320 of detecting an error in a media stream program. Conveniently stage 310 includes receiving at least one non-addressable program and associating an address with packets that convey the program.

Conveniently, stage 320 includes separating the media streams from additional information included within the MPCP stream. Conveniently stage 320 includes de-capsulation of media stream packets and analyzing the media stream packets to detect media stream program errors.

It is noted that if no errors were detected stage 320 is followed by a stage of outputting MPCP or TS that does not include packets that originate from a duplicating media stream. It is further noted that even if an error is detected then method 30 can include trying to fix the error instead of switching between media streams Stage 320 is followed by stage 330 of replacing the defective media stream by a duplicate media stream.

Stage 330 is followed by stage 340 of outputting an output MPCP stream that comprises the duplicate media stream and media streams of the received multiple media streams. Conveniently, stage 340 includes providing a first output MPCP stream and a duplicating output MPCP stream.

Conveniently, stages 320 or 340 include performing media processing operations of the multiple media streams.

Conveniently, method 300 includes replacing address information associated with media stream packets in response to a required destination of these media stream packets.

According to an embodiment of the invention stage 340 includes outputting one or more TSs in addition to or instead of outputting one or more MPCP streams. This can occur when the method 300 outputs packets to be provides to an HFC network, or otherwise to networks or equipment (including end user equipment) that does not require the MPCP information. This may occur where a single TS is conveyed over a unique path while other TS are conveyed over different paths.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method, comprising:
   receiving a first multi purpose communication protocol stream that comprises multiple media streams and receiving at least one duplicate media stream; and outputting an output media stream that comprises at least one media stream program that is comprised in the multi purpose communication protocol stream;
   detecting a error in the media stream program of the multi purpose communication protocol stream; and
   replacing the defective media stream by a duplicate media stream; wherein the replacing comprises ceasing to output the media stream program of the multi purpose communication protocol stream, and outputting the output media stream that comprises a duplicate media stream of the at least one duplicate media stream.

2. The method according to claim 1, wherein the replacing comprises outputting the output media stream that is an output multiple purpose communication protocol stream that comprises the duplicate media stream and media streams of the received multiple media streams.

3. The method according to claim 1 further comprising separating the media streams from additional information included within the multi purpose communication protocol stream.

4. The method according to claim 1 further comprising performing media processing operations of the multiple media streams.

5. The method according to claim 1 further comprising de-capsulating media stream packets and analyzing the media stream packets to detect media stream program errors.

6. The method according to claim 1 further comprising replacing address information associated with media stream packets in response to a required destination of these media stream packets.

7. The method according to claim 1, wherein the replacing comprises outputting the output media stream that is a first output multiple purpose communication protocol stream and a duplicating output multiple purpose communication protocol stream.

8. The method according to claim 1 further comprising receiving at least one non-addressable program and associating address with packets that convey the program.

9. The method according to claim 1 wherein the error comprises a quality level degradation; wherein the replacing comprises ceasing the outputting of the media stream program of the multi purpose communication protocol stream and replacing the media stream program with the duplicate media stream that have higher quality level.

10. A method for providing a video stream over a network, the method comprising:
    receiving multiple addressable packets that comprise media content that belong to multiple media streams and to at least one duplicating media stream;
    processing the multiple addressable packets to determine media stream layer errors; and
    replacing addressable packets that comprise media content that belong to a defective media stream by addressable packets that belong to a corresponding duplicate stream; wherein the replacing comprises ceasing to output addressable packets that comprise media content that belong to the defective media stream.

11. The method according to claim 10 further comprising outputting a stream of multiple addressable packets that comprise media content that belong to proper multiple media streams and to the duplicate media stream.

12. The method according to claim 11 further comprising separating media content from additional information included within the addressable packets.

13. The method according to claim 10 further comprising performing media processing operations of the media content.

14. The method according to claim 10 further comprising de-capsulating addressable packets and analyzing the media content to detect media stream layer errors.

15. The method according to claim 10 further comprising replacing address information associated with the addressable packets in response to a required destination of these media stream packets.

16. The method according to claim 10 further comprising providing a first multiplex of addressable packets and a duplicate multiplex of addressable packets.

17. The method according to claim 10 further comprising receiving multiple non-addressable packets and associating them with address information.

18. The method according to claim 10 wherein a media layer error comprises a quality level degradation.

19. A system, comprising:
    at least one input port adapted to receive a first multi purpose communication protocol stream that comprises multiple media streams and at least one duplicate media stream;
    at least one output port adapted to output an output media stream that comprises at least one media stream program that is comprised in the multi purpose communication protocol stream; and
    at least one processor adapted to detect a error in the media stream program of the multi purpose communication protocol stream and to participate in a replacement of the defective media stream by a duplicate media stream; wherein the replacing comprises ceasing to output the media stream program of the multi purpose communication protocol stream, and outputting the output media stream that comprises a duplicate media stream of the at least one duplicate media stream.

20. The system according to claim 19 adapted to output an output multiple purpose communication protocol stream that comprises the duplicate media stream and media streams of the received multiple media streams.

21. The system according to claim 19 wherein at least one processor is adapted to separate the media streams from additional information included within the multi purpose communication protocol stream.

22. The system according to claim 19 further comprising performing media processing operations of the multiple media streams.

23. The system according to claim 19 wherein at least one processor is adapted to de-capsulate media stream packets and analyze the media stream packets to detect media stream program errors.

24. The system according to claim 19 wherein at least one processor is adapted to replace address information associated with media stream packets in response to a required destination of these media stream packets.

25. The system according to claim 19 further adapted to provide a first output multiple purpose communication protocol stream and a duplicating output multiple purpose communication protocol stream.

26. The system according to claim 16 wherein at least one processor is adapted to associate addresses with non-addressable program packets.

27. The system according to claim 19 wherein the error comprises a quality level degradation.

28. The system according to claim 19, wherein the at least one input port is adapted to receive at least one of first multi purpose communication protocol stream and the at least one duplicate media stream from an external system, wherein the at least one output port is adapted to output the output media stream that comprises the at least one media stream program that is comprised in the multi purpose communication protocol stream to the external system.

29. A system, comprising:
- at least one input port adapted to receive multiple addressable packets that comprise media content that belong to multiple media streams and to at least one duplicating media stream;
- at least one processor adapted to process the multiple addressable packets to determine media stream layer errors to control, and to participate in a replacement of addressable packets that comprise media content that belong to a defective media stream by addressable packets that belong to a corresponding duplicate stream;
- wherein the system is adapted to cease outputting addressable packets that comprise media content that belong to the defective media stream.

30. The system according to claim 29 further adapted to output a stream of multiple addressable packets that comprise media content that belong to proper multiple media streams and to the duplicate media stream.

31. The system according to claim 29 wherein at least one processor is adapted to separate media content from additional information included within the addressable packets.

32. The system according to claim 29 wherein at least one processor is adapted to perform media processing operations of the media content.

33. The system according to claim 29 wherein at least one processor is adapted to decapsulate addressable packets and analyze the media content to detect media stream layer errors.

34. The system according to claim 29 wherein at least one processor is adapted to replace address information associated with the addressable packets in response to a required destination of these media stream packets.

35. The system according to claim 29 further adapted to provide a first multiplex of addressable packets and a duplicate multiplex of addressable packets.

36. The system according to claim 29 wherein at least one processor is adapted to associate address information with multiple non-addressable packets.

37. The system according to claim 29 wherein a media layer error comprises a quality level degradation.

* * * * *